(12) United States Patent
Friedman et al.

(10) Patent No.: US 8,433,103 B2
(45) Date of Patent: Apr. 30, 2013

(54) LONG DISTANCE MULTIMODAL BIOMETRIC SYSTEM AND METHOD

(75) Inventors: Marc D. Friedman, Needham, MA (US); Pablo Casaverde, Nashua, NH (US); Tim McNerney, Newton, MA (US); Yasunari Tosa, Arlington, MA (US); David Usher, Waltham, MA (US); David Muller, Boston, MA (US); Faisal Bashir, Woburn, MA (US); David J. Hitchcock, Watertown, MA (US)

(73) Assignee: Identix Incorporated, Bloomington, MN (US)

( * ) Notice: Subject to any disclaimer, the term of this patent is extended or adjusted under 35 U.S.C. 154(b) by 937 days.

(21) Appl. No.: 11/898,188

(22) Filed: Sep. 10, 2007

(65) Prior Publication Data

US 2008/0069411 A1 Mar. 20, 2008

Related U.S. Application Data

(60) Provisional application No. 60/844,644, filed on Sep. 15, 2006.

(51) Int. Cl.
*G06K 9/00* (2006.01)

(52) U.S. Cl.
USPC .......................... 382/116; 382/117; 382/118

(58) Field of Classification Search ........... 382/116–118
See application file for complete search history.

(56) References Cited

U.S. PATENT DOCUMENTS

| 3,069,654 | A | 12/1962 | Hough |
| 4,641,349 | A | 2/1987 | Flom et al. |
| 5,291,560 | A | 3/1994 | Daugman |
| 5,572,596 | A | 11/1996 | Wildes et al. |
| 5,751,836 | A | 5/1998 | Wildes et al. |
| 5,836,872 | A | 11/1998 | Kenet et al. |
| 5,850,470 | A * | 12/1998 | Kung et al. ................... 382/157 |
| 5,859,686 | A | 1/1999 | Aboutalib et al. |
| 5,953,440 | A | 9/1999 | Zhang et al. |

(Continued)

FOREIGN PATENT DOCUMENTS

WO 2005 008567 A1 1/2005

OTHER PUBLICATIONS

Guo et al., "A System for Automatic Iris Capturing", Mitsubishi Electric Research Laboratories, TR2005-044, 2005.*

(Continued)

*Primary Examiner* — Anand Bhatnagar
*Assistant Examiner* — Soo Park
(74) *Attorney, Agent, or Firm* — Nixon Peabody LLP (57) ABSTRACT

A system for multimodal biometric identification has a first imaging system that detects one or more subjects in a first field of view, including a targeted subject having a first biometric characteristic and a second biometric characteristic; a second imaging system that captures a first image of the first biometric characteristic according to first photons, where the first biometric characteristic is positioned in a second field of view smaller than the first field of view, and the first image includes first data for biometric identification; a third imaging system that captures a second image of the second biometric characteristic according to second photons, where the second biometric characteristic is positioned in a third field of view which is smaller than the first and second fields of view, and the second image includes second data for biometric identification. At least one active illumination source emits the second photons.

27 Claims, 4 Drawing Sheets

U.S. PATENT DOCUMENTS

| | | | |
|---|---|---|---|
| 6,011,624 A * | 1/2000 | de Groot | 356/511 |
| 6,144,754 A | 11/2000 | Okano et al. | |
| 6,152,563 A | 11/2000 | Hutchinson et al. | |
| 6,215,891 B1 | 4/2001 | Suzaki et al. | |
| 6,229,907 B1 | 5/2001 | Okano et al. | |
| 6,247,813 B1 | 6/2001 | Kim et al. | |
| 6,285,780 B1 | 9/2001 | Yamakita et al. | |
| 6,373,968 B2 | 4/2002 | Okano et al. | |
| 6,442,465 B2 * | 8/2002 | Breed et al. | 701/45 |
| 6,526,160 B1 | 2/2003 | Ito | |
| 6,529,630 B1 | 3/2003 | Kinjo | |
| 6,532,298 B1 * | 3/2003 | Cambier et al. | 382/117 |
| 6,542,624 B1 | 4/2003 | Oda | |
| 6,546,121 B1 | 4/2003 | Oda | |
| 6,571,002 B1 | 5/2003 | Ogawa | |
| 6,591,064 B2 | 7/2003 | Higashiyama et al. | |
| 6,597,377 B1 | 7/2003 | MacPhail | |
| 6,614,919 B1 | 9/2003 | Suzaki et al. | |
| 6,700,998 B1 | 3/2004 | Murata | |
| 6,714,665 B1 | 3/2004 | Hanna et al. | |
| 6,753,919 B1 | 6/2004 | Daugman | |
| 6,760,467 B1 | 7/2004 | Min et al. | |
| 6,778,698 B1 | 8/2004 | Prakash et al. | |
| 6,785,406 B1 | 8/2004 | Kamada | |
| 6,850,631 B1 | 2/2005 | Oda et al. | |
| 6,944,318 B1 | 9/2005 | Takata et al. | |
| 6,992,717 B2 | 1/2006 | Hatano | |
| 7,099,495 B2 | 8/2006 | Kodno et al. | |
| 7,130,453 B2 | 10/2006 | Kondo et al. | 382/117 |
| 7,155,035 B2 | 12/2006 | Kondo et al. | |
| 7,197,166 B2 | 3/2007 | Jeng | |
| 7,277,561 B2 | 10/2007 | Shin | |
| 7,362,884 B2 * | 4/2008 | Willis et al. | 382/116 |
| 7,583,823 B2 | 9/2009 | Jones et al. | 382/117 |
| 7,593,550 B2 | 9/2009 | Hamza | 382/117 |
| 7,599,524 B2 | 10/2009 | Camus et al. | 382/117 |
| 7,697,734 B2 * | 4/2010 | Jung et al. | 382/117 |
| 8,064,647 B2 * | 11/2011 | Bazakos et al. | 382/117 |
| 2002/0136435 A1 * | 9/2002 | Prokoski | 382/118 |
| 2003/0012413 A1 | 1/2003 | Kusakari et al. | |
| 2003/0108224 A1 * | 6/2003 | Ike | 382/117 |
| 2003/0118217 A1 * | 6/2003 | Kondo et al. | 382/117 |
| 2004/0197011 A1 | 10/2004 | Camus et al. | |
| 2005/0078868 A1 | 4/2005 | Chen et al. | |
| 2005/0084179 A1 | 4/2005 | Hanna et al. | |
| 2005/0251347 A1 | 11/2005 | Perona et al. | |
| 2006/0008124 A1 | 1/2006 | Ewe et al. | |
| 2006/0140453 A1 * | 6/2006 | Geng | 382/115 |
| 2006/0140454 A1 * | 6/2006 | Northcott et al. | 382/117 |
| 2006/0147094 A1 | 7/2006 | Yoo | |
| 2006/0165266 A1 | 7/2006 | Hamza | |
| 2006/0187305 A1 * | 8/2006 | Trivedi et al. | 348/169 |
| 2006/0228005 A1 * | 10/2006 | Matsugu et al. | 382/116 |
| 2007/0036397 A1 | 2/2007 | Hamza | |
| 2007/0047772 A1 | 3/2007 | Matey et al. | |
| 2007/0047773 A1 | 3/2007 | Martin et al. | |
| 2007/0110284 A1 | 5/2007 | Rieul et al. | |
| 2007/0160266 A1 | 7/2007 | Jones et al. | |
| 2007/0160267 A1 | 7/2007 | Jones et al. | |

OTHER PUBLICATIONS

Wang et al., "Combining Face and Iris Biometrics for Identity Verification", Proceedings of Fourth International Conference on AVBPA, Guildford, UK, 2003, pp. 805-813.*

Y. Park, et al.; "A Fast Circular Edge Detector for the Iris Region Segmentation"; S.-W. Lee, H.H. Buelthoff, T. Poggio (Eds.) BMCV 2000, LNCS 1811, pp. 417-423, 2000.

Christel-Loic Tisse, et al.; "Person identification technique using human iris recognition"; Advanced System Technology; Universite de Montpellier.

Libor Masek; "Recognition of Human Iris Patterns for Biometric Identification"; School of Computer Science and Software Engineering, The University of Western Australia, 2003, pp. 1-56.

Xiaomei Liu, et al.; "Experiments with an Improved Iris Segmentation Algorithm"; Department of Computer Science and Engineering University of Notre Dame; Fourth IEEE Workshop on Automatic Identification Advanced Technologies (AutoID), Oct. 2005, New York, 6 pages.

Ping-Sung Liao, et al.; "A Fast Algorithm for Multilevel Thresholding"; Journal of Information Science and Engineering 17, pp. 713-727 (2001).

Nobuyuki Otsu; "A Threshold Selection Method from Gray-Level Histograms"; IEEE Transactions on Systems Man and Cybernetics, vol. SMC-9, No. I, Jan. 1979.

International Search Report for PCT/US08/75910, dated Nov. 28, 2008, 3 pages.

Written Opinion for PCT/US08/75910, dated Nov. 28, 2008, 9 pages.

European Search Report corresponding to European patent Application Serial No. 07 84 2181, European Patent Office, dated Aug. 27, 2010, 7 pages.

Ross et al.; "Handbook of Multibiometrics"; Springer Science, New York, US XP002597965 ISBN: 978-0-387-22296-7; p. 51; Jun. 24, 2006.

Fancourt et al.; "Iris Recognition at a Distance"; Audio- and Video-based Biometric Person Authentication; (Lecture Notes in Computer Science;; LNCS), Springer-Verlag, Berlin/Heidelberg, pp. 1-13; XP019013243; ISBN: 978-3-540-27887-0; Jun. 28, 2005.

Basit, A. et al. "A Fast and Robust Iris Localization Method." IADIS International Conference Applied Computing, Feb. 25-28, 2006 (pp. 557-560).

Camus, T. et al. "Reliable and Fast Eye Finding in Close-up Images." Proceedings of the 16th International Conference on Pattern Recognition. vol. 1, 2002 (pp. 389-394).

Liu, X. et al. "Experiments with an Improved Iris Segmentation Algorithm." Fourth IEEE Workshop on Automatic Identification Advanced Technologies, Oct. 2005 (6 pages).

Vezhnevets, V. et al. "Robust and Accurate Eye Contour Extraction." International Conference Graphicon, 2003 (4 pages).

* cited by examiner

LONG DISTANCE MULTIMODAL BIOMETRIC SYSTEM AND METHOD

CROSS REFERENCE TO RELATED APPLICATIONS

This application claims priority to U.S. Provisional Application No. 60/844,644 filed Sep. 15, 2006, the contents of which are incorporated entirely herein by reference.

BACKGROUND OF INVENTION

1. Field of the Invention

The present invention relates generally to systems and methods for biometric identification, and more particularly, to imaging systems and methods capable of biometric identification according to more than one modality, especially for subjects positioned at a distance from the image capture system.

2. Description of the Related Art

Due to the unique character of each individual's face or iris, various systems attempt to use either the face or the iris for biometric identification. As such, commercially available imaging systems used for biometric identification generally use a single biometric modality. In other words, these systems employ imaging systems that process images of the face or the iris, but not both. As a result, these single modal systems suffer from the limitations inherent in face-only imaging systems or iris-only imaging systems. As a further disadvantage, commercially available iris-only systems usually image one iris at a time, and not two eyes simultaneously, or near simultaneously. In addition, conventional face-only or iris-only imaging systems suffer from constraints that prevent these systems from acquiring and tracking a person among multiple persons within a specified field of view from a distance. For example, the greater the distance between the imaging system and the target, the more difficult it is to acquire images that may be used for biometric identification.

SUMMARY OF THE INVENTION

In view of the limitations of the single modal systems described previously, embodiments of the present invention provide a biometric system for capturing and combining biometric information from more than one modality. In particular, embodiments of the present invention may provide multimodal biometric systems that generate and process images from the face and the two irises of subjects. Biometrics based on a combination of data from both irises and the face, as provided by such embodiments, are more accurate and robust than using biometrics based on data from only a single iris or only the face. Furthermore, such embodiments exhibit lower fail-to-acquire (FTA) metrics than iris or face only systems and are less susceptible to spoofing.

In addition, embodiments of the present invention may provide multimodal systems that capture biometric data from subjects who are positioned at a distance from the system. For example, a multimodal biometric system may capture and process images of the face and both irises of subjects who are 50 meters away from the system. As such, the system solves the problem of capturing an image of both irises at a long distance. In particular, aspects of this system provide sufficient illumination of the iris, achieve adequate resolution with the captured iris image, and minimize the iris's exposure to any damaging illumination.

In one embodiment, a system for multimodal biometric identification includes a first imaging system that detects one or more subjects in a first field of view, where the one or more subjects includes a targeted subject having a first biometric characteristic and a second biometric characteristic. In addition, the system includes a second imaging system that captures a first image of the first biometric characteristic according to first photons reflecting from the first biometric characteristic, where the first biometric characteristic is positioned in a second field of view which is smaller than the first field of view, and the first image includes first data for biometric identification. Furthermore, the system includes a third imaging system that captures a second image of the second biometric characteristic according to second photons reflecting from the second biometric characteristic, where the second biometric characteristic is positioned in a third field of view which is smaller than the first and second fields of view, and the second image includes second data for biometric identification. At least one active illumination source emits the second photons to be reflected from the second biometric characteristic. A controller operates the first imaging system, the second imaging system, the third imaging system, and the at least one illumination source according to programmed instructions. The controller includes at least one or more independent sub-controllers and/or one or more interdependent sub-controllers. In particular embodiments, the first biometric characteristic may be a face and the second biometric characteristic may be at least one iris corresponding to an eye of the targeted subject.

In yet another embodiment, a method for multimodal biometric identification includes the steps of: identifying one or more subjects in a first field of view; selecting a targeted subject from the one or more subjects, where the targeted subject has a first biometric characteristic and a second biometric characteristic; aligning a second field of view to the first biometric characteristic, where the second field of view is smaller than the first field of view; aligning a third field of view to the second biometric characteristic, where the third field of view is smaller than the first field of view and the second field of view; actively illuminating with second photons the second biometric characteristic; capturing a first image of the first biometric characteristic according to first photons, where the first image includes first data for biometric identification; and capturing a second image of the second biometric characteristic according to the second photons, where the second image includes second data for biometric identification.

Embodiments of the present invention may employ subject tracking, face tracking and recognition, iris tracking from facial tracking and recognition, iris image capture, high speed iris image processing, optimal optics and illumination design, as well as compliance with applicable safety and technology standards.

These and other aspects of the present invention will become more apparent from the following detailed description of the preferred embodiments of the present invention when viewed in conjunction with the accompanying drawings.

DETAILED DESCRIPTION

Figure 1:
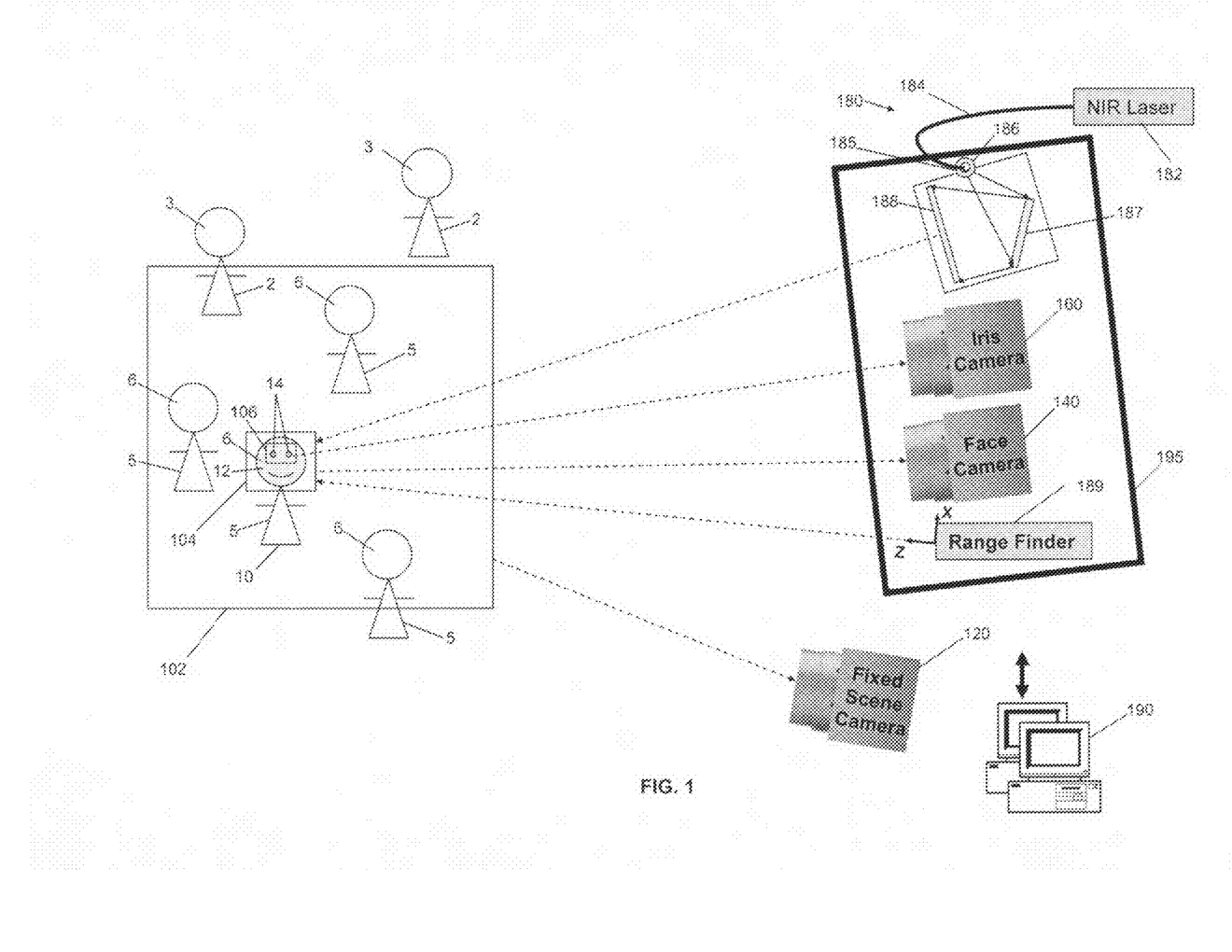
FIG. 1 illustrates a system configured to capture and process biometric data from a subject's face and two irises.

Referring to FIG. 1, an embodiment of a biometric system 100 employing more than one modality is illustrated. In particular, the multimodal biometric system 100 includes three imaging systems. The first imaging system is a scene imaging system 120 for identifying one or more subjects for biometric identification from a distance. The second imaging system is a face imaging system 140 for capturing images of the face 12 of a target subject 10 from a distance. The third imaging system is an iris imaging system 160 for capturing images of each iris 14 of the target subject 10 from a distance. In some embodiments, the imaging systems 120, 140, and 160 as well as other components may be housed in a single image capture device, but the components of the biometric system 100 may house the components in any number of combinations and any number of devices.

The scene imaging system 120 may include one or more cameras that capture images based on photons with visible, near-infrared (NIR), or infrared (IR) wavelengths. The visible wavelengths detected may be in a range of approximately 400 nm to 700 nm; the NIR wavelengths detected may be in a range of approximately 700 nm to 2 μm; and the IR wavelengths detected may be in a range of approximately 2 μm to 13 μm. In some embodiments, the scene imaging system 120 captures images through passive imaging. Passive imaging refers to the detection of photons that are initially emitted from a source external to the biometric system 100, also referred to as ambient photon generation. In certain indoor or outdoor scenarios, passive imaging by the scene imaging system 120 may detect photons with visible, NIR, and/or IR wavelengths. For example, the biometric system 100 may be used to check subjects attending a large sporting event or similar public gathering, where the ambient lighting at the venue generates a sufficient level of photons with visible wavelengths for detection by the scene imaging system 120. In other embodiments, however, the scene imaging system 120 may detect photons that are provided by an illumination source (not shown) controlled by the biometric system 100, i.e., active illumination.

The face imaging system 140 may include a camera that captures images of the face based on photons with visible, NIR, or IR wavelengths. The visible wavelengths detected may be in a range of approximately 400 nm to 700 nm; the NIR wavelengths detected may be in a range of approximately 700 nm to 2 μm; and the IR wavelengths detected may be in a range of approximately 2 μm to 13 μm. In some embodiments, the face imaging system 140 may employ passive imaging to detect photons with visible, NIR, or IR wavelengths. In other embodiments, the face imaging system 140 may detect photons that are provided by an illumination source controlled by the biometric system 100, i.e., active illumination.

The iris imaging system 160 may include a camera that captures iris images based on photons with visible or NIR wavelengths. Photons with visible or NIR wavelengths may be used for iris recognition if the iris sensor is sufficiently large and an adequately high resolution is employed. The visible wavelengths detected may have a range of approximately 400 nm to 700 nm. The NIR wavelengths detected may be in a range of approximately 700 nm to 2 μm, or preferably, a range of 700 nm to 900 nm corresponding to the wavelength requirements for the ANSI specification for Iris Image Interchange Format (ANSI INCITS 379-2004). The preferable range may generally be determined according to the existing Iris Image Interchange Format standard.

The iris sensor of the iris imaging system 160 may have a significantly higher magnification than the face sensor of the face imaging system 140. In some embodiments, commercially available sensors may be employed, where the sensors, for example, employ 752×480 pixels for each eye image, have a resolution in the range of approximately 16 to 21 pixels/mm, and have a quantum efficiency of approximately 25 to 30 percent at 850 nm illumination.

In some embodiments, the optical design of the iris imaging system 160 may employ a zooming telescope lens having an aperture of 100 mm for 3 m to 6 m. For other embodiments in which very long distances are involved, telescopes having an aperture of approximately 50 cm to 100 cm for 50 m may be employed. In particular, the telescope may have a Ritchey-Chrétien design, i.e. a hyperbolic Cassegrain telescope with a very flat field. In addition, the resolution may be 2 lp/mm to 4 lp/mm, thereby complying with ANSI specifications (ANSI INCITS 379-2004). Meanwhile, the opto-mechanical requirements may be met with commercially available ultra-high precision axis encoders (resolutions <0.002 arc-sec).

Figure 3:
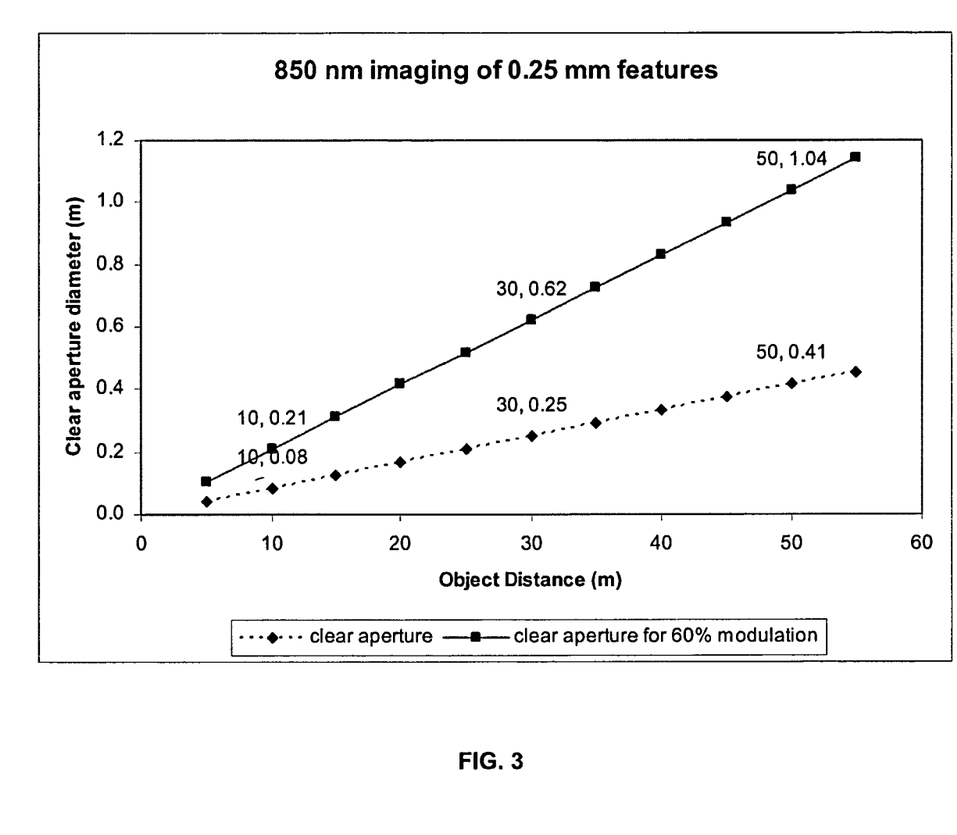
FIG. 3 illustrates the range of clear apertures required to resolve 0.25 mm with 850 nm illumination at varying object distances.
Figure 4:
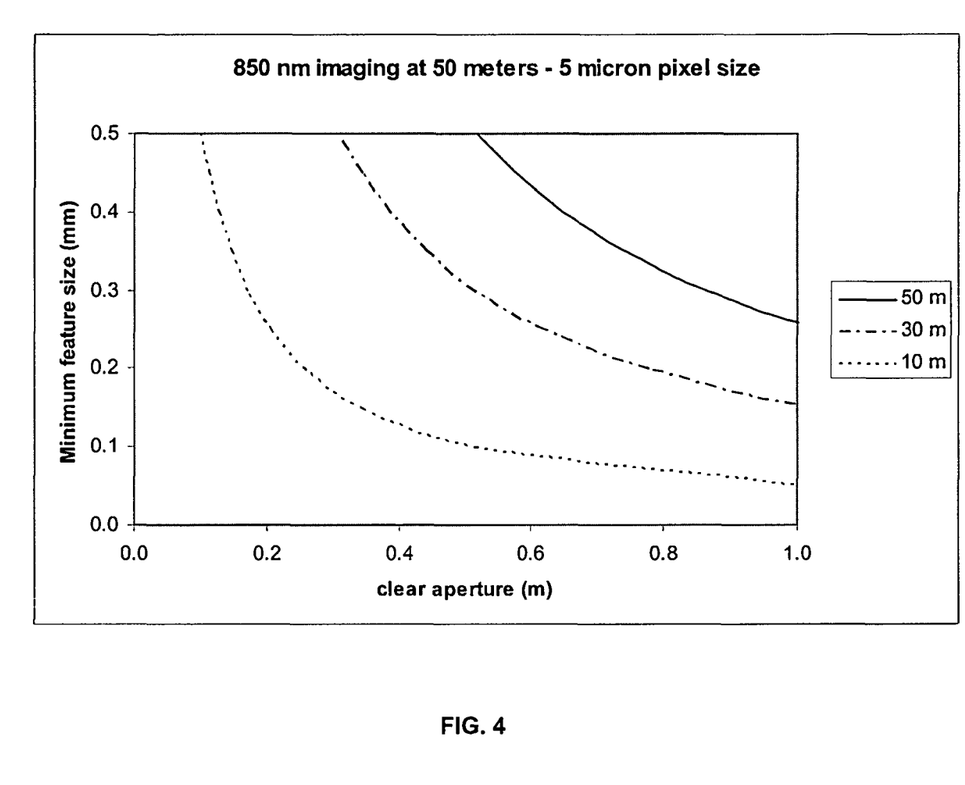
FIG. 4 illustrates the range of clear apertures versus minimum resolvable feature size.

To illustrate the ability of embodiments to resolve features at a distance, FIG. 3 illustrates the range of clear apertures required to resolve 0.25 mm with 850 nm illumination at varying object distances. In addition, FIG. 4 illustrates the range of clear apertures versus minimum resolvable feature size, particularly imaging with 850 nm illumination at 50 meters with 5 μm pixel size.

One or more illumination systems, such as the illumination system 180 in FIG. 1, may be employed for active illumination. In particular, the illumination system 180 may emit photons with NIR wavelengths which are reflected from the irises 14 of the subject 10 and subsequently detected by iris imaging system 160. As discussed previously, such illumination systems may also be used for active imaging by the face imaging system 140. As illustrated in FIG. 1, the illumination system 180 may employ an NIR laser source 182. Filters or coated optics may be employed in the optical train to select specific wavelengths, but still allow a visible color image. In a particular embodiment, for example, the illumination system 180 may have a wavelength of approximately 850 nm and a collimated beam with a spot size diameter of approximately 30 cm full width half-maximum (FWHM). In this embodiment, the laser illumination may be provided with an average power of approximately 1 W and a continuous wave with an irradiance of 2 mW/cm2 or less. Accordingly, referring to FIG. 1, an optical fiber 184 is coupled to the laser 182. The optical fiber 184 is positioned to direct photons to a rotating diffuser 185 rotating at approximately 1000 revolutions per minute. Rotation of the diffuser 185 helps reduce speckle of the illumination. A notch filter 186 may also be placed in line to minimize any visible illumination from the illumination system 180 that may alert people to the presence of the biometric system 100, especially when the biometric system 100 is intended to be used covertly, i.e. without the subjects' knowledge. As shown in FIG. 1, the illumination expands from the optical fiber 184 and is directed to a mirror 187. The illumination is reflected to a Fresnel lens 188 where it is collimated. The beam may be collimated or slightly diverging.

Alternatively, rather than providing continuous wave illumination as described previously, the laser may be pulsed at 50 nsec with a 10 kHz duty cycle. Advantageously, employing a quasi-CW laser reduces laser speckle.

As FIG. 1 also shows, an optical laser rangefinder 189 with a wavelength, for example, of 904 nm may be used to detect the distance along the Z-axis from the rangefinder 189 to the targeted subject 10. This Z-distance is utilized to improve the accuracy of estimates of the (X, Y, Z) position of the targeted subject 10 as well as to determine the range of focus and zoom, for example, by the iris camera lens of the iris imaging system 160. The Z-distance provides a starting value for a search for an image with the highest focus measure. The Z-distance information may also be utilized to predict the anticipated movement of the subject.

As further illustrated in FIG. 1, the illumination source 180 may be integrated into a pan-tilt unit (PTU) 195. The PTU 195 may be controlled to direct photons to specific biometric features which are then captured by the iris imaging system 140 and possibly the face imaging system 160. Accordingly, in one embodiment, the illumination system 180 may be operated in burst mode triggered in coordination with the respective imaging system 140 or 160. The illumination source 180 may also be employed for range finding to achieve auto focusing by the respective imaging system 140 or 160, as described previously.

In further embodiments, the PTU 195 may be used to target and track subjects. As shown in FIG. 1, the illumination system 180, the camera of face imaging system 140, the camera of the iris imaging system 160, and the rangefinder 189 may all be mounted on the single PTU 195. The camera of the face imaging system 140, the camera of the iris image system 160, and the rangefinder 189 are oriented on the PTU 195 so that they receive photons from the illumination source 180 which are reflected from the targeted subject 10. Therefore, the PTU 195 may be controlled to steer the mounted systems to direct photons from the illumination system 180 and to permit the co-aligned imaging systems 140 or 160 to capture the photons reflected from the respective biometric feature, i.e., face or iris.

In some embodiments, one or more beam steering systems (not shown), as are known, may additionally or alternatively be employed to direct the photons which are detected by the imaging systems 120, 140, and 160 for image capture. The beam steering systems may include galvanometric mirrors and/or imaging optics positioned on a gimbal mount. The beam steering systems may direct photons from the illumination source 180 to a biometric feature of the targeted subject 10. Additionally or alternatively, the beam steering systems may direct photons reflected from the biometric feature to the appropriate imaging system.

Embodiments of the present invention meet the safety criteria of Class I ANSI Z136. In general, the maximum permissible exposure (MPE) for continuous wave exposure at 850 nm is approximately 2 mW/cm$^2$. As such, the illumination source 180 in some embodiments may provide illumination with a wavelength of 850 nm for up to 30,000 seconds. On the other hand, the maximum permissible exposure (MPE) for repetitive pulse exposure at 850 nm is approximately 0.56 mW/cm$^2$. Thus, the illumination source 180 in other embodiments may provide illumination with a wavelength of 850 nm in a 10 second pulse train with 50 nsec pulses at 10 KHz. Other considerations for laser safety include the operational environment, the use of additional optical devices, such as glasses and binoculars, by targeted subjects, as well as the presence of specular surfaces.

As illustrated in FIG. 1, the imaging systems 120, 140, and 160 each provide different fields of view. In particular, FIG. 1 shows that the scene imaging system 120 has the larger field of view 102. The field of view 102, for example, may be several square meters, depending on the distance of subjects from the scene imaging system 120. Any number of subjects for biometric identification may pass through and/or be positioned within the field of view 102. As illustrated, the heads 6 of subjects 5 are positioned within the field of view 102, while the heads 3 of subjects 2 are positioned outside the field of view 102. Additionally, FIG. 1 shows a smaller field of view 104 that corresponds with the face imaging system 140. For example, the area of the field of view 104 may be approximately 0.15 m$^2$. The head 12 of a single targeted subject 10 is isolated within the field of view 102 for further biometric analysis. Moreover, FIG. 1 shows yet a smaller field of view 106 that corresponds with the iris imaging system 160. The field of view 106 defines an area that isolates the irises 14 of the targeted subject 10 for biometric identification.

To obtain a full 360-degree field of view for the scene imaging system 120, the scene imaging system 120 may employ a plurality of scene cameras. The cameras may be arranged so that the field of view 102 for each camera overlaps, abuts, or nearly abuts other fields of view 102, whereby a series of fields of view 102 forms a continuous or nearly continuous a larger 360-degree field of view.

Alternatively, some embodiments may employ imaging systems which are all co-aligned using beam steering mirrors. As is known with other security monitoring systems, the use of a beam steering mirrors may be employed to enable the imaging systems to rotate through 360 degrees for observation.

Accordingly, some embodiments can identify multiple people within a 360 degree panoramic view. Employing such a system may require capturing images in rapid succession from a plurality of subjects who are moving within the panoramic view. Known techniques exist for stitching several detectors together to allow for rapid reading of the image to allow for increased frame rates. Moreover, aspects of these embodiments minimize occlusion of the subject's face and/or irises, minimize the time required to process the captured images, and overcome the constraints associated with the mechanical operation of the system.

Referring to FIG. 1, the system 100 may employ at least one controller 190 to control the operation of the imaging systems 120, 140, and 160. The controller 190 may also be employed to process the image data captured by the imaging systems 120, 140, and 160. Furthermore, the controller 190 may control the operation of the beam steering system 195, the laser range finder 189, and the illumination source 180 as a part of a target acquisition system. As is known, the controller 190 may include one or more programmable processing devices that execute software, or stored instructions. For example, the controller 190 may employ an external conventional computer networked with the image systems 120, 140, and 160, as shown in FIG. 1. Alternatively, a field programmable gate array (FPGA) or digital signal processor (DSP) may be employed on board a single image capture device that houses the imaging systems 120 140, and 160. Combinations of single and/or multiple programmable devices, including computers, FPGAs, and DSPs may be employed with various communications topologies and physical configurations to achieve scalable speed and/or performance targets.

Thus, with the face imaging system 140 and the iris imaging system 160, the multimodal biometric system 100 generates images of the face and two irises for biometric identification. The controller 190 may operate the face imaging system 140 to capture an image of the subject's face 12 and the iris imaging system 160 to capture images of each iris 14 from the subject's right and left eyes all simultaneously, or near simultaneously.

Biometrics based on a combination of facial and iris data, as provided by the system of FIG. 1, are more accurate and robust than using biometrics that include data from only a single iris or only the face. Furthermore, such embodiments exhibit lower fail-to-acquire (FTA) metrics than iris or face only systems and are less susceptible to spoofing. Advantageously, the iris and face present biometric features that are both independent and coupled. They are independent in that they are extracted from different biological structures. On the other hand, the iris and face biometric features are strongly coupled because there is a fixed geometric relationship between the iris and the face. Specifically, the position and orientation of an eye is reflected simultaneously in both the iris and the face. The coupling between the biometric features of the iris and the face not only facilitates the simultaneous capture of these biometric features, but allows these features to be cross-referenced or combined in a common feature space that preserves the geometric relationship between the iris and face. In addition, the use of an iris system complements the use of face system.

Figure 2:
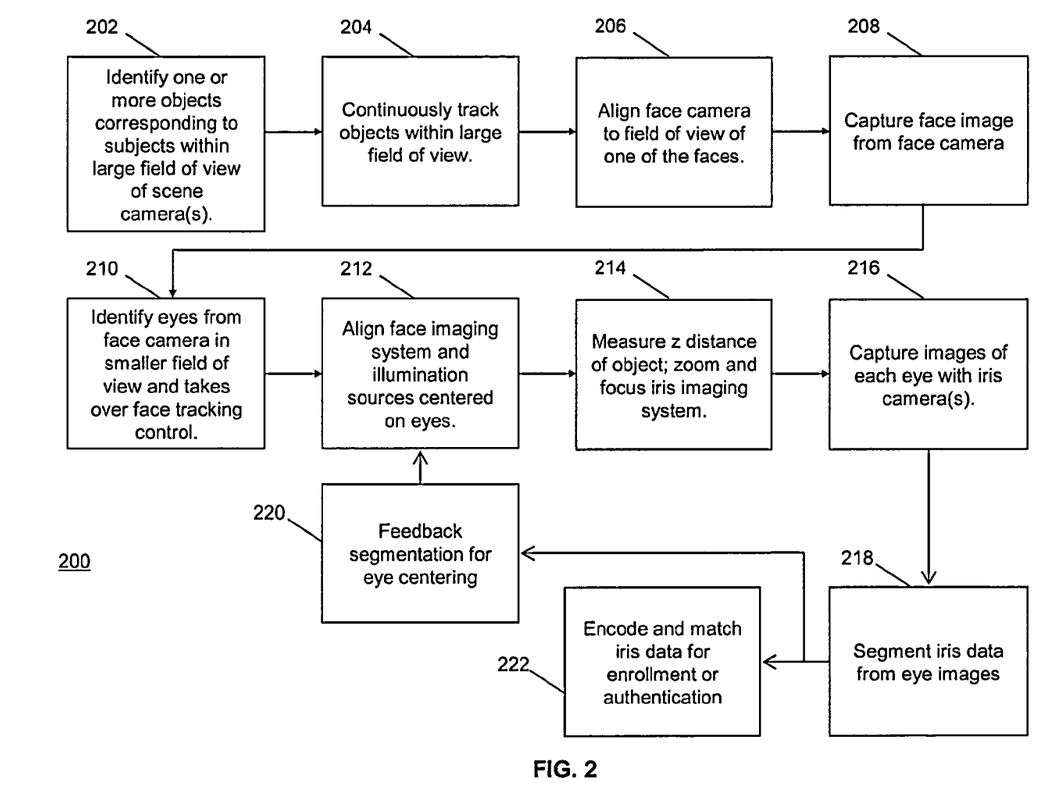
FIG. 2 illustrates a method for capturing and processing biometric data from a subject's face and two irises, according to aspects of an embodiment of the present invention.

Referring to FIG. 2, an exemplary process 200 for operating the multimodal biometric system 100 is illustrated. With the scene imaging system 120, the system 100, in step 202, identifies one or more objects, corresponding to the heads 6 of subjects 5 in the field of view 102. In step 204, the system 100 continuously tracks all objects, which may move within the field of view 102. In step 206, the system 100 aligns the center of the field of view 104 to one of the objects. As shown in FIG. 1, the object in the field of view 104 corresponds to the head 6 of the targeted subject 10. In step 208, the face imaging system 140, which is co-aligned with the scene imaging system 120, captures an image from the field of view 104 at a sufficiently high magnification and resolution to permit face identification. In step 210, the system 100 identifies the eyes of the face 12 and takes over control of tracking. In step 212, the system 100 adjusts the targeting system to align the face imaging system 140 as well as the NIR illumination source 180 with an area substantially centered on the eyes. In step 214, the rangefinder 189 measures the Z distance of the object and zooms and focuses the iris imaging system 160. In step 216, the iris imaging system 160 captures images of the irises 14. In step 218, the iris data is segmented from the images. In step 220, feedback from the iris segmentation may be used to fine tune eye centering if required. In step 222, the segmented iris data is encoded and matched for enrollment or authentication. Authentication may include identifying a subject or verifying a subject's identity. As discussed previously, the iris imaging system 160 may have one or more iris sensors with higher magnification for capturing images of the irises 14. As such, the center of the iris sensors are aligned with the eyes and the iris sensors capture the images of the irises 14. As provided by step 204, throughout the process 200, the system 100 continues to track the objects it has identified in the field of view 102, including the objects which have already been targeted for biometric identification and processed according to steps 206 through 222. In this way, the system 100 is able to determine which objects still need to be targeted for biometric processing.

Information captured by the face imaging system 140 and the iris imaging system 160 is used to establish facial pattern recognition, iris pattern recognition, as well as biometric fusion. To achieve biometric identification, the information from the imaging systems may be used to determine a host of attributes including, but not limited to, positioning of the face or the irises, tracking of the face or irises, measurements of focus provided in the images, and interpupillary distance.

For example, the software executed by the controller 190 for capturing and processing images of the face 12 and irises 14 may determine characteristics such as linear (X,Y,Z) position of the head, head pose angle, and eye-gaze angle. Head pose angle indicates pitch, yaw, and roll, where pitch refers to up-and-down rotation of the head, yaw refers to side-to-side rotation of the head, and roll refers to rotation the head along a direction from ear to shoulder. Meanwhile, eye-gaze angle refers to the up-and-down or side-to-side viewing angle of the eyes.

To minimize the effect of environmental factors, such as heat from hot surfaces which can distort captured images, some embodiments may employ a Hartmann-Shack sensor to correct for these environmental factors.

Once the positioning of the biometric features is determined and images are captured by the facial/iris imaging system, the software executed by the controller 190 also detects and processes images of the face 12 and irises 14 in the captured data. For instance, as shown in step 218 of FIG. 2, the images of the irises are segmented from the captured data, and before the segmented iris images are passed on for further biometric processing or matching, the segmented iris images may be tested according to a variety of criteria measuring the quality of an image. Such algorithms for processing iris images as well as other relevant algorithms are provided in a U.S. patent application titled MULTIMODAL OCULAR BIOMETRIC SYSTEM AND METHODS, filed on Sep. 10, 2007, which claims priority to U.S. Provisional Application No. 60/844,659 filed Sep. 15, 2006, the contents of all these applications being incorporated entirely herein by reference.

Once the iris image data is segmented and tested according to step 218, the iris image data may be employed for biometric matching with databases of existing iris data or may be recorded for biometric enrollment, as shown in step 222. When iris data is collected from multiple subjects in rapid succession, the enrollment may be anonymous, i.e. recorded without further identification data, such as a name.

In general, embodiments of the present invention may employ various configurations of imaging systems that capture iris images and face images. Although many of the features of embodiments of the present invention may be described with respect to the configuration shown in FIG. 1, it is understood that other configurations can implement these features in order to combine iris and face images for biometric identification.

While the embodiments described previously may employ NIR laser illumination for the facial/iris imaging system, other embodiments of the present invention may employ LEDs or flash lamps rather than laser diodes. As such, in these alternative embodiments, the system can perform facial and iris liveness testing. Facial liveness testing detects whether the biometric information comes from a living source. (U.S. patent application Ser. No. 11/258,749, filed on Oct. 26, 2005, describes a METHOD AND SYSTEM FOR DETECTING BIOMETRIC LIVENESS, and is entirely incorporated herein by reference.)

Moreover, while the embodiments described previously may direct NIR laser illumination over a long distance to the face 12 or the irises 14, other embodiments may employ use of LED's positioned more closely to the targeted subject. For example, such LED's may be employed to illuminate a subject as the subject is guided down a specific corridor of known length and width. In other words, if the subject is guided near a known position, an illumination source may be set up near the known position so that photons for image capture do not have to be transmitted over longer distances.

Embodiments of the present invention may be fully automatic or may require some operator input, especially with regard to initial targeting of subjects. In other words, an operator selectively targets subjects for biometric analysis. Advantageously, the operator can ensure that the illumination sources are not directed at subjects who may susceptible to eye damage from photons emitted by the illumination sources. For example, embodiments of the present invention may be employed to identify and screen subjects at an event, such as a highly attended sporting event. At such events, spectators often use optical aids, such as binoculars, to view the game or match. Eye damage might result if laser illumination is conducted to the eyes of a targeted individual through such an optical aid. As a result, an operator-assisted mode can prevent the laser illumination from being directed at subjects using an optical aid.

As described above, the controller 190 may be a programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present invention, as is appreciated by those skilled in the computer and software arts. The physical processors and/or machines may be externally networked with the image capture device, or may be integrated to reside within the image capture device. Appropriate software can be readily prepared by programmers of ordinary skill based on the teachings of the exemplary embodiments, as is appreciated by those skilled in the software art. In addition, the devices and subsystems of the exemplary embodiments can be implemented by the preparation of application-specific integrated circuits or by interconnecting an appropriate network of conventional component circuits, as is appreciated by those skilled in the electrical art(s). Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, and the like. Moreover, parts of the processing of the exemplary embodiment of the present inventions can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present invention has been described in connection with a number of exemplary embodiments, and implementations, the present inventions are not so limited, but rather cover various modifications, and equivalent arrangements.

What is claimed is:

1. A multimodal biometric identification system, comprising:
   a first imaging system that detects one or more subjects in a first field of view, the one or more subjects including a targeted subject having a first biometric characteristic including a face and a second biometric characteristic including at least one iris corresponding to an eye of the targeted subject, wherein the first imaging system only receives passive illumination photons reflected from the one or more subjects to detect the first biometric characteristic, the passive illumination photons being generated by a source external to the multimodal biometric identification system and having at least one of a visible wavelength, a near-infrared wavelength, and an infrared wavelength;
   a second imaging system that captures a first image of the first biometric characteristic according to first photons reflecting from the first biometric characteristic, the first biometric characteristic being positioned in a second field of view which is smaller than the first field of view, and the first image including first data for biometric identification;
   a third imaging system that captures a second image of the second biometric characteristic according to second photons reflecting from the second biometric characteristic, the second biometric characteristic being positioned in a third field of view which is smaller than the first and second fields of view, and the second image including second data for biometric identification;
   at least one active illumination source that emits the second photons to be reflected from the second biometric characteristic, the at least one active illumination source further configured to reduce, via a filter, visible illumination from the at least one active illumination source; and
   a controller that operates the first imaging system, the second imaging system, the third imaging system, and the at least one illumination source according to programmed instructions, the controller comprising at least one of: one or more independent sub-controllers and one or more interdependent sub-controllers wherein the controller does not control the source external to the multimodal biometric identification system, the controller being configured to receive the first and second data for biometric identification and to biometrically identify the targeted subject by processing both the first and second data in combination, wherein the controller is further configured to align the second field of view according to the first biometric characteristic.

2. The system according to claim 1, wherein the multimodal biometric identification system provides no feedback to the one or more subjects.

3. The system according to claim 2, wherein the controller determines a face position for the face according to the second field of view, the controller determines the third field of view according to the position of the face, and the controller determines an iris position for the at least one iris according to the third field of view.

4. The system according to claim 1, wherein the second photons have at least one of a near-infrared wavelength and a visible wavelength.

5. The system according to claim 1, wherein the at least one active illumination source further emits the first photons to be reflected from the first biometric characteristic, and the first photons have at least one of a visible wavelength, a near-infrared wavelength, and an infrared wavelength.

6. The system according to claim 1, wherein the first photons to be reflected from the first biometric characteristic are passive illumination photons generated by an external illumination source and have at least one of a visible wavelength, a near-infrared wavelength, and an infrared wavelength.

7. The system according to claim 1, wherein the controller tracks, with the first imaging system, the one or more subjects in the first field of view.

8. The system according to claim 1, wherein the first field of view provides a continuous 360-degree view, and the first imaging system comprises a plurality of cameras configured to provide the continuous 360-degree view.

9. The system according to claim 1, wherein the controller determines a position of the second field of view according to image data corresponding to the one or more subjects detected by the first imaging system.

10. The system according to claim 1, further comprising a pan-tilt unit that aligns at least one of the first imaging system, the second imaging system, the third imaging system, and the at least one illumination system with the targeted subject.

11. The system according to 1, wherein the one or more subjects are positioned between approximately six meters and approximately fifty meters from at least one of the first imaging system, the second imaging system and the third imaging system, and wherein the third imaging system further includes:
   a zooming telescope lens having an aperture of approximately fifty centimeters to approximately one-hundred centimeters.

12. The system according to claim 1, wherein the filter is a notch filter.

13. The system according to claim 1, wherein the controller is further configured to align the third field of view according to the second biometric characteristic.

14. A method for a multimodal biometric identification system, the method comprising the steps of:
   identifying one or more subjects in a first field of view;
   selecting a targeted subject from the one or more subjects, the targeted subject having a first biometric characteristic including a face and a second biometric characteristic including at least one iris corresponding to an eye of the targeted subject;
   aligning, with a controller associated with the multimodal biometric identification system, a second field of view according to the first biometric characteristic, the second field of view being smaller than the first field of view;
   aligning, with the controller, a third field of view according to the second biometric characteristic, the third field of view being smaller than the first field of view and the second field of view;
   actively illuminating with second photons the second biometric characteristic, the second photons being filtered with a filter to reduce visible illumination;
   receiving, by a first imaging system, only passive illumination photons reflected from the one or more subjects to detect the first biometric characteristic, the passive illumination photons being generated by an ambient source not controlled by the controller and having at least one of a visible wavelength, a near-infrared wavelength, and an infrared wavelength;
   capturing, with a second imaging system, a first image of the first biometric characteristic according to first photons, the first image including first data for biometric identification;
   capturing, with a third imaging system, a second image of the second biometric characteristic according to the second photons, the second image including second data for biometric identification;
   receiving the first and second data for biometric identification by the controller; and
   biometrically identifying the targeted subject by processing both the first and second data in combination by the controller.

15. The method according to claim 14, wherein the multimodal biometric identification system provides no feedback to the one or more subjects.

16. The method according to claim 15, further comprising determining a position for the face according to the second field of view, and determining an iris position for the at least one iris according to the third field of view.

17. The method according to claim 14, wherein the second photons have at least one of a near-infrared wavelength and a visible wavelength.

18. The method according to claim 14, further comprising actively illuminating with the first photons the first biometric characteristic, wherein the first photons have at least one of a visible wavelength, a near-infrared wavelength, and an infrared wavelength.

19. The method according to claim 14, wherein the first photons are passive illumination photons generated by an external illumination source and have at least one of a visible wavelength, a near-infrared wavelength, and an infrared wavelength.

20. The method according to claim 14, further comprising the step of tracking the one or more subjects in the first field of view.

21. The method according to claim 14, wherein the step of identifying one or more subjects in a first field of view comprises identifying one or more subjects in a continuous 360-degree view.

22. The method according to claim 14, further comprising the step of determining a position of the second field of view according to image data corresponding to the one or more subjects.

23. The method according to claim 14, further comprising the steps of processing the second image and realigning the third field of view according to the processed second image.

24. The method according to claim 14, wherein the step of capturing a first image comprises receiving the first photons from a distance of approximately six meters to approximately fifty meters, or capturing a second image comprises the step of receiving the second photons from a distance of approximately three meters to approximately fifty meters, and wherein the second image is captured according to photons passing through a zooming telescope lens having an aperture of approximately fifty centimeters to approximately one-hundred centimeters.

25. The method according to claim 14, further comprising the step of enrolling the targeted subject or authenticating the targeted subject by matching the first data and the second data.

26. The method according to claim 14, wherein the second photons are filtered with a notch filter.

27. A multimodal biometric identification system comprising:
- a first imaging system that detects one or more subjects in a first field of view, the one or more subjects including a targeted subject having a first biometric characteristic including a face and a second biometric characteristic including at least one iris corresponding to an eye of the targeted subject, wherein the first imaging system only receives passive illumination photons reflected from the one or more subjects to detect the first biometric characteristic, the passive illumination photons being generated by a source external to the multimodal biometric identification system and having at least one of a visible wavelength, a near-infrared wavelength, and an infrared wavelength;
- a second imaging system that captures a first image of the first biometric characteristic according to first photons reflecting from the first biometric characteristic, the first biometric characteristic being positioned in a second field of view which is smaller than the first field of view, and the first image including first data for biometric identification;
- a third imaging system that captures a second image of the second biometric characteristic according to second photons reflecting from the second biometric characteristic, the second biometric characteristic being positioned in a third field of view which is smaller than the first and second fields of view, and the second image including second data for biometric identification, the third imaging system including:
- a hyperbolic Cassegrain telescope with a zooming telescope lens having an aperture of approximately fifty centimeters to approximately one-hundred centimeters for providing a resolution of the second image of approximately two line pairs per millimeter to approximately four line pairs per millimeter, and
- a pan-tilt unit having at least two high precision axis encoders with resolutions less than approximately two milliarcseconds for aligning the hyperbolic Cassegrain telescope with the third field of view;
- at least one active illumination source that emits the second photons to be reflected from the second biometric characteristic, the at least one active illumination source including:
- an optical fiber for directing a beam of illumination including the second photons from the at least one active illumination source,
- a rotating diffuser configured to rotate at approximately one-thousand rotations per minute for reducing speckle of the directed beam of illumination,
- a notch filter configured to reduce visible illumination of the directed beam of illumination, and
- a Fresnel lens for collimating the beam of illumination; and
- a controller that operates the first imaging system, the second imaging system, the third imaging system, and the at least one illumination source according to programmed instructions, the controller comprising at least one of: one or more independent sub-controllers and one or more interdependent sub-controllers, wherein the controller does not control the source external to the multimodal biometric identification system, the controller being configured to receive the first and second data for biometric identification and to biometrically identify the targeted subject by processing both the first and second data in combination, wherein the controller is further configured to align the second field of view according to the first biometric characteristic.

* * * * *